J. C. DUEBER.

WATCH CASE CENTER.

No. 10,566. Reissued Mar. 3, 1885.

Attest.
S. S. Carpenter
William H. Haller.

Inventor.
John C. Dueber
by James H. Layman
atty.

N. PETERS, Photo-Lithographer, Washington, D. C.

UNITED STATES PATENT OFFICE.

JOHN C. DUEBER, OF NEWPORT, KENTUCKY.

WATCH-CASE CENTER.

SPECIFICATION forming part of Reissued Letters Patent No. 10,566, dated March 3, 1885.

Original No. 290,870, dated December 25, 1883. Application for reissue filed April 17, 1884.

*To all whom it may concern:*

Be it known that I, JOHN C. DUEBER, of Newport, in the county of Campbell and State of Kentucky, have invented certain new and useful Improvements in Watch-Case Centers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to the construction of a two-part ring-formed middle member of a watch-case, technically known as the "center," and is more particularly designed to facilitate and perfect the manufacture of those watch-case centers that are formed from sheet-brass that has been gold-plated on one side, commonly known as "gold rolled plate." In the customary mode of forming such centers by "spinning" from a "hoop" of the plated material, it happens that (even in the hands of the highly-paid artisans usually employed on this work) very many pieces are rendered unfit for making up into cases in consequence of the rupture of the skin of precious metal at the sharp salient angles of the "steps" ("snaps") required to enable the caps, backs, and bezels to snap snugly to the center. Moreover, the tools employed are very costly. This loss and damage I avoid by stamping out of the rolled plate two annular parts, whose meeting edges are preferably coincident with the middle plane or equator of the watch-case, and are adapted to be lapped and then locked together, as hereinafter explained. Centers thus manufactured can be more perfectly and accurately finished, even by inferior workmen, at a great saving of material and wages, and also of expensive tools, as previously stated.

Figure 1:
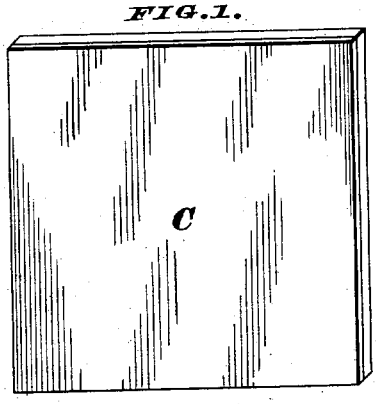
Figure 2:
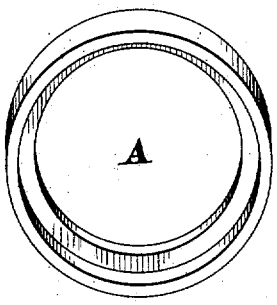
Figure 3:
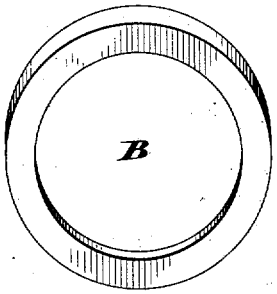
Figure 4:
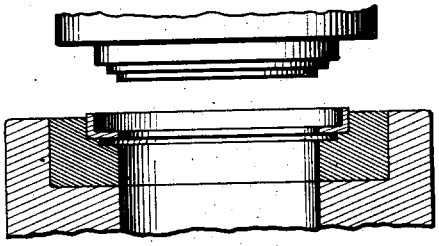
Figure 5:
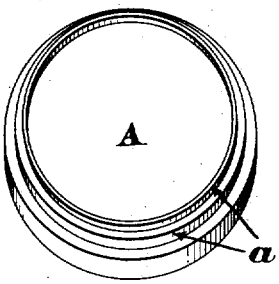
Figure 6:
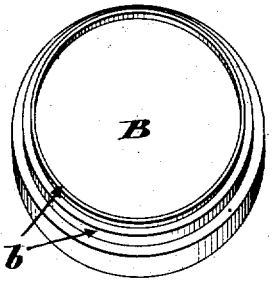
Figure 7:
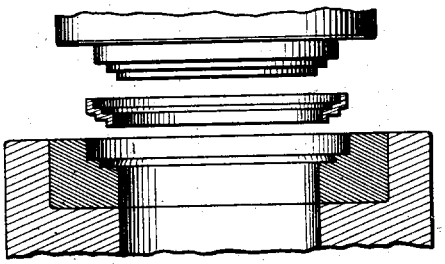
Figure 9:
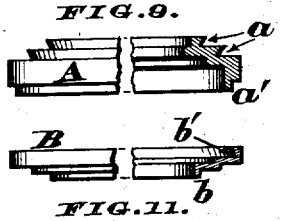
Figure 10:
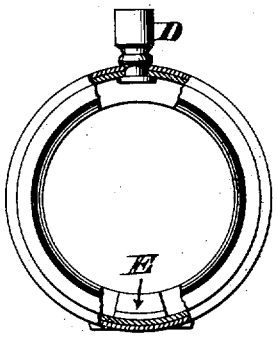
Figure 11:
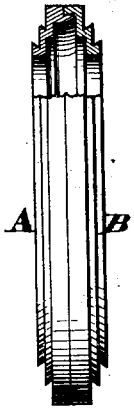
Figure 8:
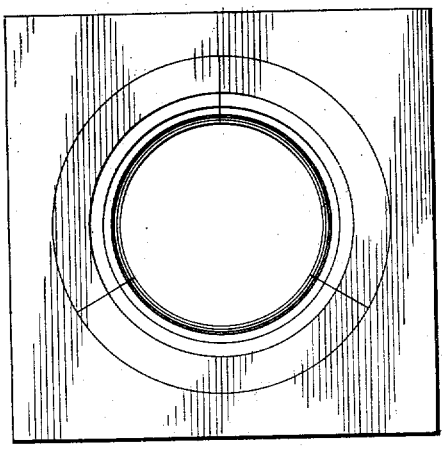
Figure 12:
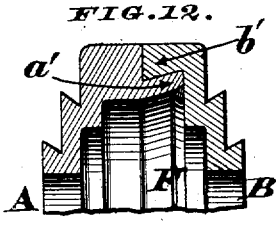

In the accompanying drawings, Figure 1 represents an ordinary "blank" of rolled gold plate. Figs. 2 and 3 represent annular pieces stamped out from such blanks. Fig. 4 represents by longitudinal section such a piece about to be subjected to the second operation in a suitable die. Figs. 5 and 6 represent two annular pieces (for the front and rear halves of the center, respectively) thus produced. Fig. 7 represents by longitudinal section such a piece about to be subjected to the third operation in a suitable die. Fig. 8 is a plan of the lower member of said die. Fig. 9 is a side view of the front annular piece, and partly side and partly sectional view of the rear annular piece as it appears after the desired acute angle has been imparted to the snaps and the desired joint to the overlapping lips, the central portions of said pieces being broken away. Figs. 10 and 11 are respectively an equatorial and an axial section of a finished center constructed on my plan. Fig. 12 is a greatly-enlarged view of the sectioned portion of the finished center seen in Fig. 11.

A and B represent annular pieces, which, after undergoing a series of manipulations about to be described, become the front or "male" and the rear or "female" members of my improved center. These members are stamped from customary rolled gold plate, of which C may represent a piece. These annular pieces A and B, having by means of a suitable die (seen in Fig. 4) been made to assume the form respectively shown in Figs. 5 and 6, in which the snaps *a b* are rectangular, are subsequently, by means of another die, (represented in Fig. 7,) pressed into a form in which the snaps become acutely angular. (See Figs. 9, 11, and 12.) The two thus formed annular pieces being then placed together in a suitable clamp or chuck within a lathe, the male lip *a'* is upset or turned outward, so as to interlock within the inwardly-receding lip *b'* of the female member by means of any convenient burnishing, spinning, or knurling tool, as shown in Figs. 11 and 12. The seam or joint may be closed and rendered invisible, either by burnishing or knurling. Finally, if desired, soldering or brazing may be applied over the joint on the concave interior wall, as seen at F in Fig. 12, which method of fastening the parts together may be rendered more secure by soldering to said parts either the pendant-bearing D or hinge-bearing E. But in some cases both of these soldered bearings D and E may be used in connection with the solder-joint F.

In Letters Patent No. 290,869, granted to me December 25, 1883, I have described a two-part center in which the lips are secured together by screw-threading, which is more accurate, generally; but in the present invention there is an advantage over the screw-thread, because the spun joint wastes less metal and does not require so much labor in its production. Both forms have distinct advantages, and are separate articles of manufacture.

I am aware that it is not new to make the center of a watch-case of two parts or halves and unite them by means of a solder-joint, as such a construction is described in the patent issued to G. W. Ladd, June 11, 1867, No. 65,579. But I know of no instance where one half or part has been provided with a lip adapted to engage or interlock with a lip of the other half; hence the present invention is not to be understood as an attempt to cover, broadly, the idea of constructing a center of two halves, and then soldering them together; but my claims are expressly limited to a center composed of two lipped parts that interlock or engage with each other, so as to form a secure joint.

I claim as my invention—

1. A watch-case center consisting of two annular parts or zones, each part having a lip, and one lip being spun or upset into the other lip, for the purpose described.

2. A watch-case center consisting of two annular parts or zones, each part having a lip, and one lip being spun or upset into the other lip and secured with a solder-joint, as at F, for the purpose described.

3. A watch-case center consisting of two annular parts or zones, one part having a lip, $b'$, projecting therefrom, and the other part having a lip, $a'$, spun or upset into said lip $b'$, said zones being soldered together, as at F, and further secured by the locking-piece D, as set forth.

4. A watch-case center consisting of two annular parts or zones, as A B, one of said parts being provided with an undercut lip, $b'$, wherewith the lip $a'$ of the other part or zone is interlocked, in the manner herein described, and for the purpose stated.

5. A watch-case center consisting of two annular parts or zones, each zone having a lip, and the lip of one zone being slipped into the lip of the other zone and secured with solder, substantially as described.

In testimony whereof I affix my signature in presence of two witnesses.

JOHN C. DUEBER.

Witnesses:

JAMES H. LAYMAN,

S. S. CARPENTER.